(12) United States Patent
Moser et al.

(10) Patent No.: US 12,170,358 B2
(45) Date of Patent: Dec. 17, 2024

(54) METHODS AND APPARATUS FOR THERMAL MANAGEMENT OF BATTERIES

(71) Applicant: Aurora Flight Sciences Corporation, a subsidiary of The Boeing Company, Manassas, VA (US)

(72) Inventors: Tim Moser, Trimbach (CH); Frederick Tischhauser, Bottmingen (CH)

(73) Assignee: Aurora Flight Sciences Corporation, a subsidiary of The Boeing Company, Manassas, VA (US)

( * ) Notice: Subject to any disclaimer, the term of this patent is extended or adjusted under 35 U.S.C. 154(b) by 5 days.

(21) Appl. No.: 17/553,297

(22) Filed: Dec. 16, 2021

(65) Prior Publication Data

US 2022/0247006 A1   Aug. 4, 2022

Related U.S. Application Data

(60) Provisional application No. 63/144,773, filed on Feb. 2, 2021.

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/625* (2015.04);
(Continued)

(58) Field of Classification Search
CPC .. H01M 50/20; H01M 50/204; H01M 50/207; H01M 50/209; H01M 50/213;
(Continued)

(56) References Cited

U.S. PATENT DOCUMENTS

| 2010/0061061 A1* | 3/2010 | Murata | H01M 50/213 |
| | | | 361/699 |
| 2012/0040227 A1* | 2/2012 | Jeong | H01M 10/617 |
| | | | 429/120 |

(Continued)

FOREIGN PATENT DOCUMENTS

| CN | 114843714 | 8/2022 |
| EP | 4037066 | 8/2022 |

(Continued)

OTHER PUBLICATIONS

"3M Novec 7100 Engineered Fluid," Sep. 2009, Retrieved from the Internet: http://multimedia.3m.com/mws/media/199818O/3mtm-novectm-7100-engineeredfluid.pdf, 4 pages.

(Continued)

*Primary Examiner* — Amanda J Barrow
(74) *Attorney, Agent, or Firm* — Hanley, Flight & Zimmerman, LLC

(57) ABSTRACT

Methods and apparatus for thermal management of batteries are disclosed herein. An example battery disclosed herein includes a housing defining a cavity and a battery cell disposed in the cavity of the housing. The battery cell has a terminal. The battery further includes a bus bar disposed in the cavity of the housing. The bus bar is coupled to the terminal. A fluid channel formed in the bus bar. The fluid channel is to receive a cooling fluid to cool the bus bar and reduce a temperature of the battery.

20 Claims, 9 Drawing Sheets

(51) Int. Cl.
  *H01M 10/625* (2014.01)
  *H01M 10/647* (2014.01)
  *H01M 10/6568* (2014.01)
  *H01M 50/505* (2021.01)

(52) U.S. Cl.
  CPC ..... *H01M 10/647* (2015.04); *H01M 10/6568* (2015.04); *H01M 50/505* (2021.01); *H01M 2220/20* (2013.01)

(58) Field of Classification Search
  CPC ......... H01M 10/6567; H01M 10/6568; H01M 10/06556; H01M 50/502; H01M 50/503; H01M 50/505; H01M 50/507
  See application file for complete search history.

(56) References Cited

U.S. PATENT DOCUMENTS

| | | | |
|---|---|---|---|
| 2015/0380784 A1* | 12/2015 | Bass | H01M 10/6569 429/120 |
| 2016/0190663 A1 | 6/2016 | Bahrami et al. | |
| 2016/0233565 A1* | 8/2016 | Weileder | H01M 50/249 |
| 2018/0118011 A1* | 5/2018 | Grace | B60L 58/26 |
| 2018/0261992 A1* | 9/2018 | Bower | H01M 50/512 |
| 2019/0027731 A1* | 1/2019 | Zeng | H01M 50/51 |
| 2019/0379093 A1 | 12/2019 | Choi et al. | |
| 2020/0266401 A1* | 8/2020 | Stuetz | B60L 50/64 |
| 2020/0266507 A1* | 8/2020 | Brunnsteiner | H01M 10/6568 |
| 2022/0131209 A1* | 4/2022 | Bartling | H01M 10/613 |

FOREIGN PATENT DOCUMENTS

| | | | | |
|---|---|---|---|---|
| JP | 2011-029103 | * | 2/2011 | ............ H01M 10/50 |
| WO | WO 2020/152567 | * | 7/2020 | ............. H01M 2/10 |

OTHER PUBLICATIONS

"Immersio™ XM25 The World's First Production-Ready Immersion-Cooled Battery System", https://www.kingmobility.com/xm25, obtained Jan. 25, 2023, 12 pages.

The European Patent Office, "Extended European Search Report", issued in connection with European Patent Application 22154388.7-1108 on Jun. 28, 2022, 24 pages.

* cited by examiner

METHODS AND APPARATUS FOR THERMAL MANAGEMENT OF BATTERIES

RELATED APPLICATION

This patent claims the benefit under 35 U.S.C. § 119(e) to U.S. Provisional Application No. 63/144,773, titled "Methods and Apparatus for Thermal Management of Batteries" filed Feb. 2, 2021, which is hereby incorporated by this reference in its entirety.

FIELD OF THE DISCLOSURE

This disclosure relates generally to batteries and, more particularly, to methods and apparatus for thermal management of batteries.

BACKGROUND

Batteries are commonly used in vehicles, such as electric vehicles (e.g., electric aircraft), to provide electrical power to one or more systems of the vehicle and/or provide the main power to propel the vehicle. These batteries commonly face temperature fluctuations, such as temperature increases. Such increases in battery temperature may cause the batteries to malfunction and/or fail. Keeping the batteries within a functional temperature range is challenging but important since fluctuations in battery temperature not only reduce the performance of the battery, but could also pose safety risks associated with battery failure during vehicle operation.

SUMMARY

This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented in this disclosure.

An example battery disclosed herein includes a housing defining a cavity and a battery cell disposed in the cavity of the housing. The battery cell has a terminal. The example battery also includes a bus bar disposed in the cavity of the housing. The bus bar is coupled to the terminal. A fluid channel is formed in the bus bar. The fluid channel is to receive a cooling fluid to cool the bus bar and reduce a temperature of the battery.

Another example battery disclosed herein includes a housing defining a cavity, a battery cell disposed in the cavity of the housing, and a cooling fluid in the cavity of the housing that at least partially submerges the battery cell. The cooling fluid partially fills the cavity such that an air gap is formed between a top surface of the cooling fluid and a top of the housing. The example battery also includes a cooling circuit disposed in the air gap.

An example method disclosed herein includes determining a temperature of a battery. The battery includes a bus bar having a fluid channel formed therein. The method includes comparing the temperature to a threshold, and, in response to determining that the temperature exceeds the threshold, activating a pump to pump cooling fluid through the fluid channel in the bus bar to reduce the temperature of the battery.

Figure 1:
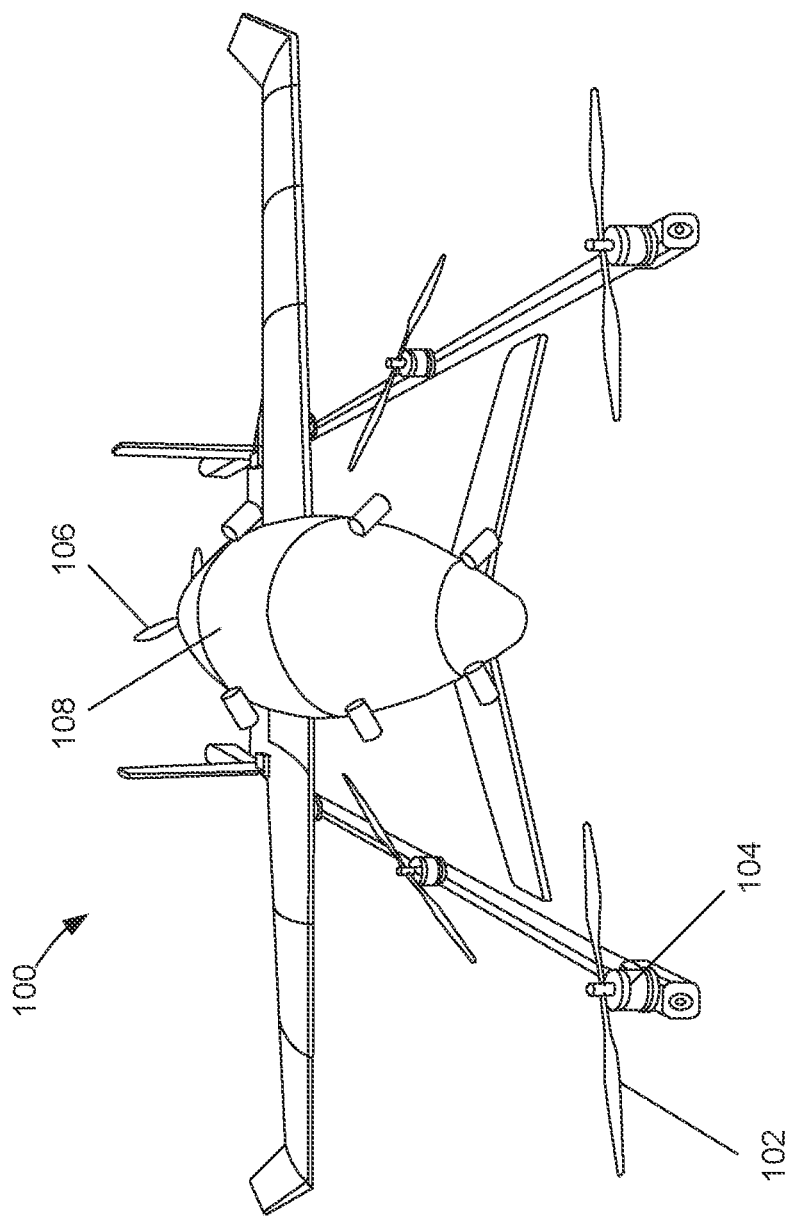
FIG. 1 illustrates an example electric-powered aircraft in which example batteries and example battery systems disclosed herein can be implemented.

The figures are not to scale. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real-world imperfections.

DETAILED DESCRIPTION

Batteries, such as lithium-ion batteries, are commonly used in vehicles such as electric vehicles. For example, electric aircraft typically include one or more lithium-ion batteries to power one or more electric motors for flying the aircraft and/or for powering other electrical systems (e.g., navigation and guidance systems, communication systems, etc.) on the aircraft. Although lithium-ion batteries are just one example of the types of batteries that can be used in vehicles, they are growing increasingly popular among aircraft manufacturers due to their higher energy density and lower weight compared to other battery types. However, a tradeoff to their improved energy capacity and weight characteristics is their potential to overheat and malfunction during use. Thus, thermal management of these batteries is important. Maintaining a battery within a certain temperature range is important not only for mitigating the risk of a thermal runaway event in one or more battery cells but also for extending the cycle life of the battery.

Currently, there exist a number of known technologies in aviation and other industries for cooling batteries in events of temperature increase and providing uniform temperature control to battery environments. For example, some known batteries include coolant or a cooling fluid that fully fills the battery cavity and submerges the individual battery cells. Other known batteries utilize cooling pipes that are routed between each of the battery cells. A drawback to these solutions is the added weight that these cooling methods and supplemental equipment incur on the battery system in order to accomplish effective cooling.

Disclosed herein are example batteries and battery systems that address at least the above-noted drawbacks. Disclosed herein is a battery including a bus bar with a fluid channel formed in the bus bar. The fluid channel is part of a cooling circuit including a pump and supply/return lines (which can be external to the battery). The pump can be activated to pump cooling fluid into the battery and through the fluid channel in the bus bar (to absorb heat from the bus bar). This operation reduces the temperature of the bus bar and, thus, reduces the temperature inside of the battery, thereby helping to maintain the battery within a certain operating temperature range. Using the bus bar to form part of the fluid circuit eliminates the need for additional cooling pipes in the battery as seen in known cooling designs. This significantly reduces the weight of the battery compared to known batteries with piping systems.

In some examples, the cooling fluid is continuously pumped through the bus bar to regulate the temperature of the battery. The mass flow of the cooling fluid can be increased or decreased to maintain the temperature of the battery within a certain temperature range. In other examples, the pump can be activated when the temperature of the battery exceeds a threshold. In some examples the cooling fluid is a liquid. In other examples, the cooling fluid is a gas.

In some examples disclosed herein, the battery includes a second cooling fluid in a housing of the battery that contains the one or more battery cells. The second cooling fluid at least partially submerges the battery cells. The second cooling fluid absorbs heat from the battery cells and helps regulate the temperature of the battery. In some examples, the second cooling fluid only partially fills the housing of the battery. As such, an air gap is formed between a top of the second cooling fluid and a top of the housing. This also reduces the weight of the battery compared to known batteries that are completely fulfilled with cooling fluid. During a temperature increase event, the second cooling fluid surrounding the battery cells undergoes a phase change from a liquid state to a gaseous state. The gas rises in the housing and then condenses on the surface of the bus bar, thus reducing the temperature of the battery cells.

Thus, the examples disclosed herein provide a battery including a bus bar with a fluid channel connected to one or more cells, which are submerged in a phase changing cooling fluid. The examples disclosed herein provide a thermal management solution for batteries to control battery temperature during temperature increases and prevent thermal runaway events. The examples of the subject disclosure address the shortcomings of current battery cooling techniques noted above.

FIG. 1 illustrates an example aircraft 100 in which one or more of the example batteries and/or example battery systems disclosed herein can be implemented. The aircraft 100 can be a manned or unmanned aerial vehicle. In this example, the aircraft 100 is an electric aircraft. However, in other examples, the aircraft 100 can be powered by other means (e.g., gas-powered). The aircraft 100 illustrated in FIG. 1 is an electric vertical take-off and landing (VTOL) aircraft having a plurality of vertical lift rotors 102 (one of which is referenced in FIG. 1) driven by respective electric motors 104 (one of which is referenced in FIG. 1). The aircraft 100 also has a forward propulsion rotor 106 driven by a motor. The example batteries and/or battery systems disclosed herein can be used to provide electrical power to the motors 104 (and the motor that drives the rotor 106) and/or any other electrical system on the aircraft 100. In some examples, the one or more batteries are disposed inside a body 108 (e.g., a fuselage) of the aircraft 100. While in this example the aircraft 100 is implemented as a VTOL aircraft, in other examples, the aircraft 100 can be implemented as any other type of aircraft (e.g., a fixed wing aircraft, a rotorcraft such as a helicopter or quadcopter, etc.). Further, it is noted that although the subject disclosure describes an aircraft 100, one or more of the example batteries and/or example battery systems disclosed herein can be implemented in any vehicle (e.g., ground and/or water vehicles).

Figure 2A:
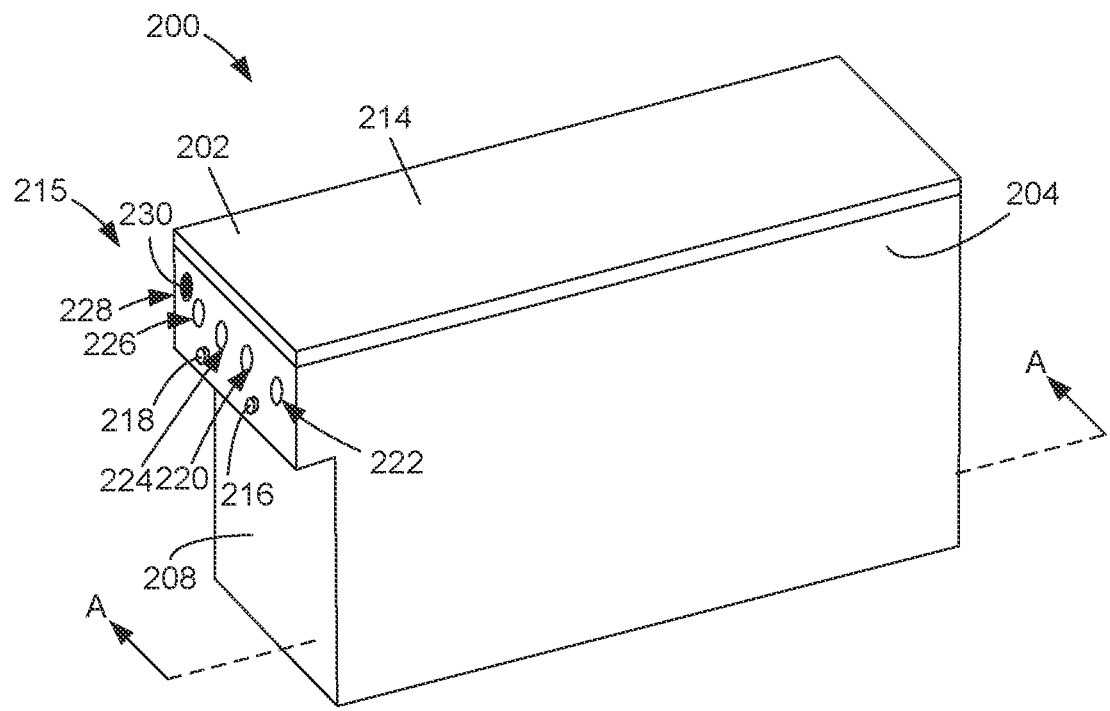
FIGS. 2A and 2B are perspective views of opposite sides of an example battery.
Figure 2B:
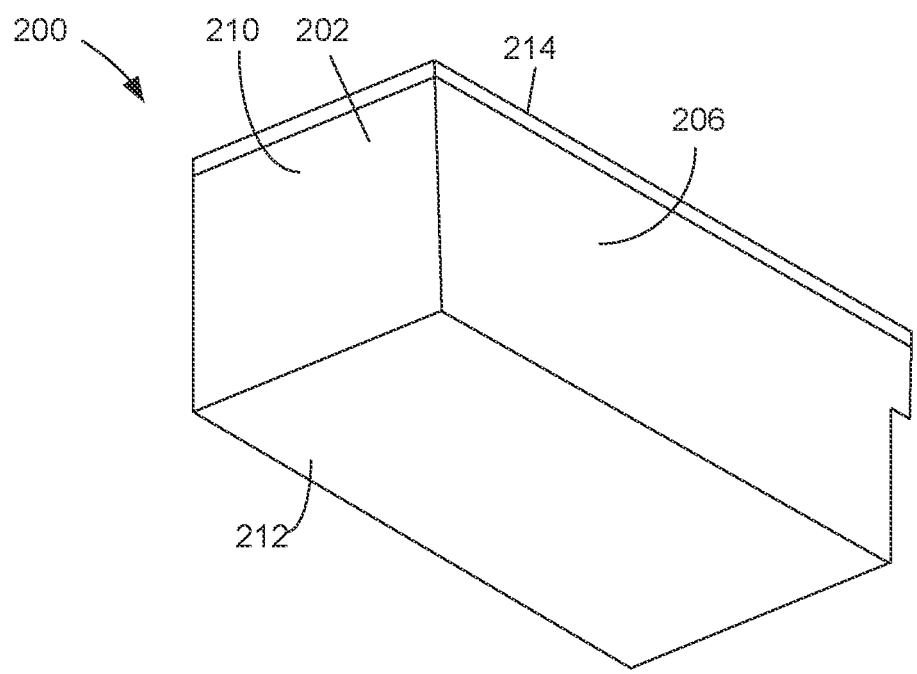

FIGS. 2A and 2B are perspective views of opposite sides of an example battery 200 constructed in accordance with the teachings of this disclosure. The example battery 200 (or multiple ones of the battery 200) can be implemented in the aircraft 100 of FIG. 1. The battery 200 includes a housing 202 that contains one or more battery cells (shown in FIG. 3). In this example, the housing 202 is cuboid shape. In particular, the housing 202 has a first sidewall 204, a second sidewall 206 that is opposite to the first sidewall 204, a first end wall 208 that is coupled between the first sidewall 204 and the second sidewall 206, and a second end wall 210 that is coupled between the first sidewall 204 and the second sidewall 206 and is opposite to the first end wall 208. In other examples, the housing 202 can include more than four side/end walls. The housing 202 also includes a bottom wall 212 is coupled to the first sidewall 204, the first end wall 208, the second sidewall 206, and the second end wall 210 to define a base of the housing 202. The housing 202 has a lid 214 (e.g., a top) that is coupled to the first and second side walls 204, 206 and the first and second end walls 208, 210 opposite to the bottom wall 212. In some examples, the lid 214 is removable to access the battery cells and/or other components in the housing 202.

In some examples, the housing 202 is hermetically sealed. In some examples, the housing 202 is constructed of a composite material. In some examples, the housing 202 is constructed of stainless steel, titanium, and/or aluminum. In other examples, the housing 202 is constructed of other types of materials. In some examples, the housing 202 is designed to withstand internal pressures of approximately 2 bar. In other examples, housing 202 can be designed to withstand higher or lower internal pressures.

In the illustrated example, the first end wall 208 has an interface portion 215 with one or more ports and terminals for fluid connections and electrical connections. For example, the example battery 200 includes a first terminal 216 and a second terminal 218. One of the terminals 216, 218 can be a positive terminal and the other of the terminals 216, 218 can be a negative terminal. In this example, the terminals 216, 218 are on the interface portion 215 on the first end wall 208. However, in other examples, the terminals 216, 218 can be on any other surface of the housing 202.

In the illustrated example, the interface portion 215 includes a first inlet port 220 and a first outlet port 222. The first inlet and outlet ports 220, 222 extend through the first end wall 208 and into the cavity defined in the housing 202. The first inlet and outlet ports 220, 222 can be connected to supply and return lines, respectively, for pumping cooling fluid through a first bus bar disposed inside of the housing 202, examples of which are disclosed in further detail herein. The interface portion 215 also includes a second inlet port 224 and a second outlet port 226 for a second bus bar. The interface portion 215 further includes a valve port 228. A pressure release valve 230 (e.g., a blow-off valve) is disposed in the valve port 228 and can release pressure from inside the housing 202 during an over-pressurization event. While in this example the ports 220-228 are disposed on the interface portion 215 on the first end wall 208, in other examples, any of the ports 220-228 can be disposed on any other surface of the housing 202.

Figure 3:
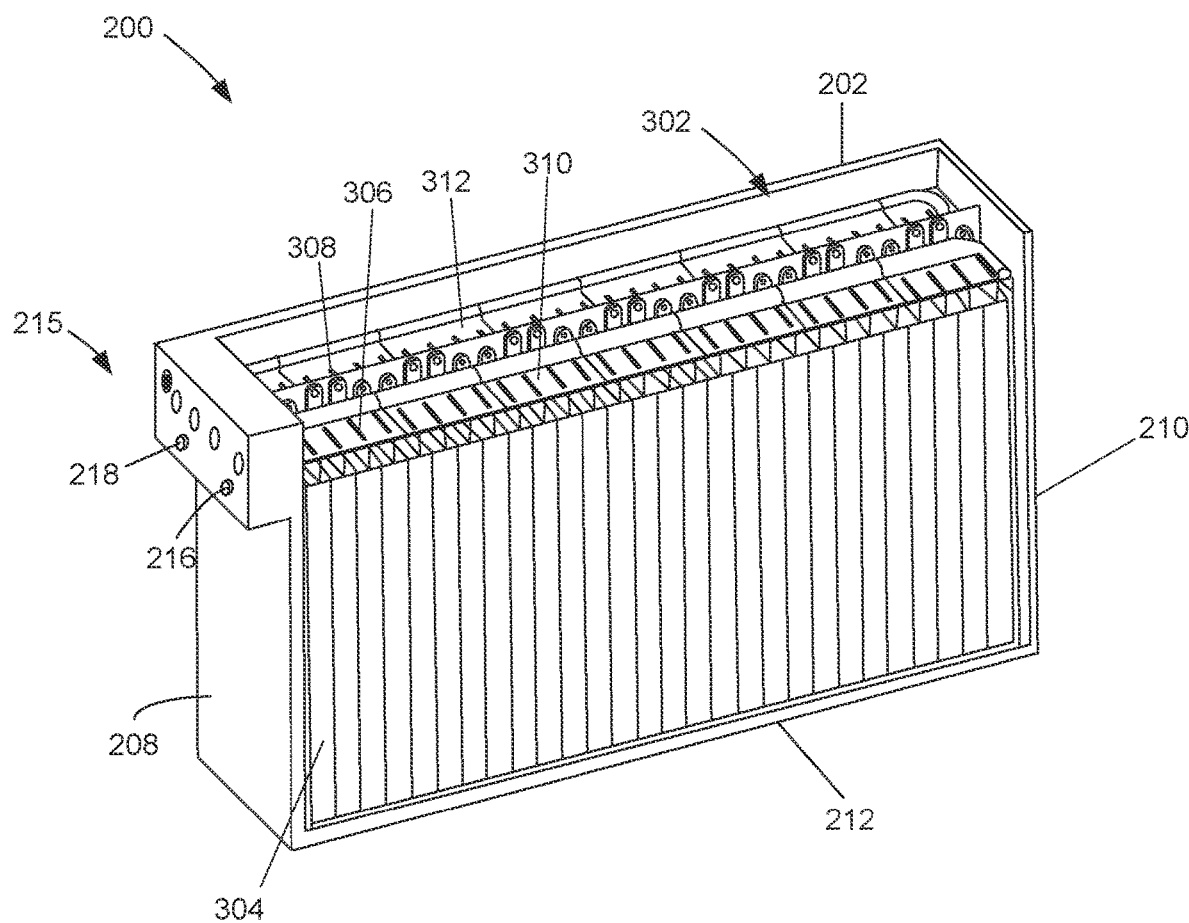
FIG. 3 is a perspective cross-sectional view of the example battery of FIGS. 2A and 2B taken along line A-A of FIG. 2A, showing example battery cells and example bus bars in an example battery housing.

FIG. 3 is a perspective cross-sectional view of the battery 200 taken along line A-A in FIG. 2A. The lid 214 (FIG. 2) has also been removed. As shown in FIG. 3, the housing 202 defines a cavity 302. The battery 200 includes a plurality of battery cells 304 (one of which is referenced in FIG. 2) disposed in the cavity 302 of the housing 202. In this example, the battery 200 includes 28 battery cells. However, it is understood that the battery 200 can include any number of battery cells 304 (e.g., one battery cell, two battery cells, three battery cells, etc.). Each of the battery cells 304 has a first terminal 306 (one of which is referenced in FIG. 3) and a second terminal 308 (one of which is reference in FIG. 3). The terminals 306, 308 are sometimes referred to as tabs. The first terminals 306 can be positive terminals and the second terminals 308 can be negative terminals. The first terminals 306 of the battery cells 304 can be electrically coupled (in a series or parallel arrangement) to one of the terminals 216, 218, and the second terminals 308 of the battery cells 304 can be electrically coupled (in a series or parallel arrangement) to the other one of the terminals 216, 218.

In some examples, the battery cells 304 are lithium-ion battery cells. In other examples, the battery cells 304 can be implemented as other types of battery cells, such lithium polymer cells, nickel cadmium cells, or nickel-metal hydride, for example. In some examples, the battery cells 304 are grouped into sections or bricks. In some examples, the bricks are 3D printed aluminum alloy (e.g., AI-Alloy AISi10Mg, Scalmalloy), with integrated features optimizing functionalities and weight. In some examples, the battery cells 304 are pouch cells, whereas other examples can include cylindrical battery cell(s) or prismatic cell(s). In the illustrated example, the battery cells 304 are arranged in a single row between the first end wall 208 and the second end wall 210. In other examples, the battery cells 304 can be arranged in two or more rows or other configurations. In some examples, the battery cells 304 are supported by and rest on the bottom wall 212. In other examples, the battery cells 304 can be spaced apart from the bottom wall 212. In some examples, the housing 202 includes features for the battery cells 304 to rest on. During use or operation of the battery 200, the temperature of the battery 200 environment can increase and, if not controlled, can cause a thermal runaway event in one or more of the battery cells 304.

As shown in FIG. 3, the battery 200 includes a first bus bar 310 and a second bus bar 312. The first and second bus bars 310, 312 are disposed in the cavity 302 of the housing 202. The first terminals 306 of the battery cells 304 are coupled (e.g., electrically coupled) to the first bus bar 310. The first bus bar 310 is constructed of a conductive material, such as metal (e.g., copper, aluminum, etc.). As such, the first bus bar 310 electrically couples the first terminals 306 of the battery cells 304 (which results in added voltage and/or current of the cells, depending on the arrangement) to the first terminal 216 of the battery 200. In some examples, the first terminals 306 extend through corresponding slots in the first bus bar 310 and are welded (e.g., laser welded) to the first bus bar 310. In other examples, the first terminals 306 can be coupled to the first bus bar 310 in other manners. The second terminals 308 are similarly coupled to the second bus bar 312, which electrically couples the second terminals 308 to the second terminal 218 of the battery 200. In some examples the first and second bus bars 310, 312 rest on the tops of the battery cells 304. In other examples, the first and second bus bars 310, 312 are spaced apart from the tops of the battery cells 304.

Figure 4:
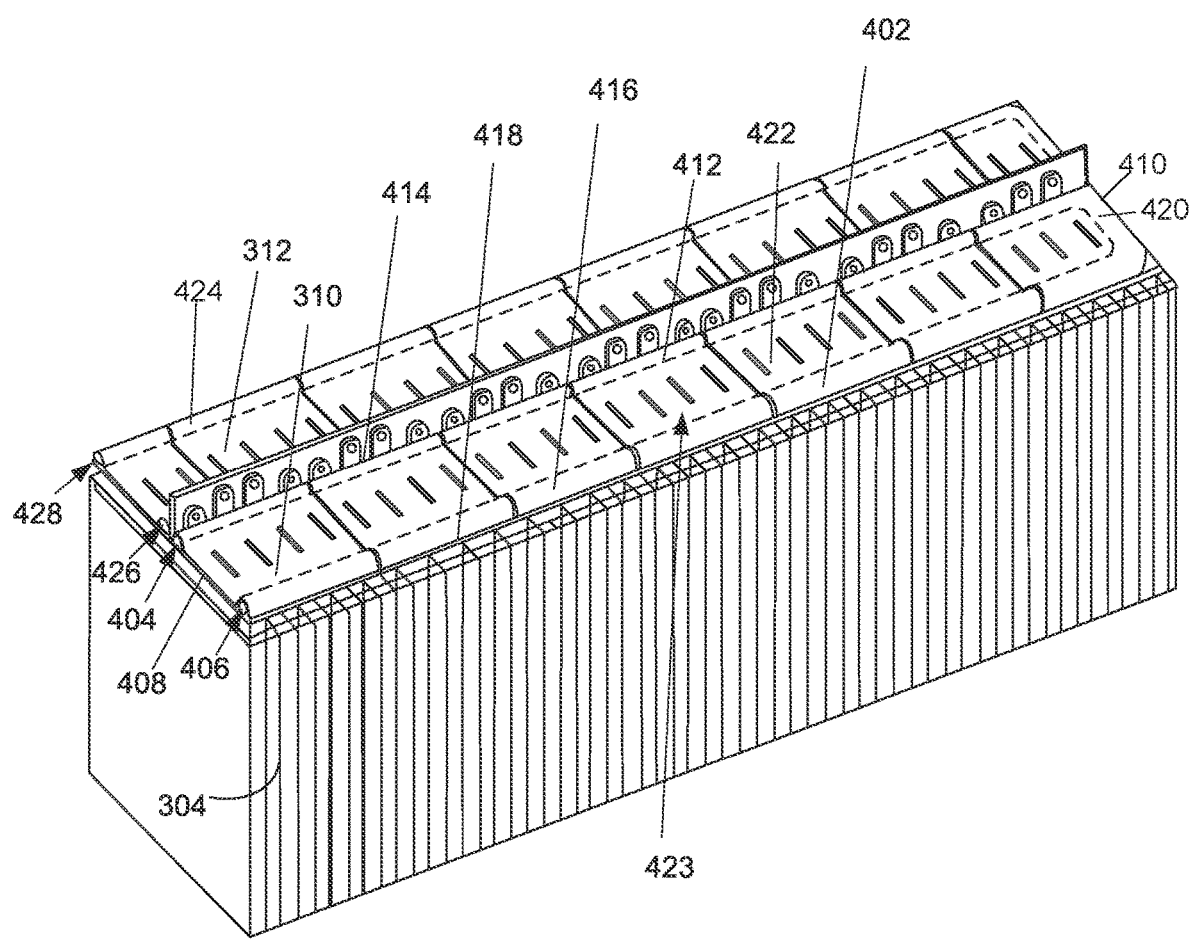
FIG. 4 is a perspective view of the example battery cells and the example bus bars of FIG. 3 removed from the example battery housing.

FIG. 4 is a perspective view of the example battery cells 304 (one of which is referenced in FIG. 4) and the first and second bus bars 310, 312 as removed the housing 202 (FIGS. 2A, 2B, and 3). As illustrated in FIG. 4, an example fluid channel 402 is formed in the first bus bar 310. The fluid channel 402 is formed between an inlet port 404 (e.g., opening) on the first bus bar 310 and an outlet port 406 on the first bus bar 310. The fluid channel 402 is to receive a cooling fluid to cool the first bus bar 310 and reduce a temperature of the battery 200. In particular, a cooling fluid can be pumped through the fluid channel 402 from the inlet port 404 to the outlet port 406. The cooling fluid absorbs heat from the first bus bar 310, thereby reducing the temperature of the first bus bar 310 and, thus, reducing the temperature of the battery 200. The cooling fluid can be non-conductive dielectric fluid (e.g., a 3M™ Novec™ fluid, ethylene glycol, propylene glycol, etc.). An example system used for pumping cooling fluid through the fluid channel 402 is disclosed in conjunction with FIG. 8. Thus, the first bus bar 310 has a dual purpose of serving as a bus bar (a tab/electrical interface) and serving as at least a portion a cooling circuit or heat sink. This significantly reduces the weight of the battery 200 compared to known batteries that have separate cooling circuits with complex piping systems that route cooling fluid between the cells and throughout the battery. Example aspects of the first bus bar 310 are disclosed in further detail herein. The second bus bar 312 is substantially the same as the first bus bar 310. Thus, it is understood that any of the example aspects disclosed in connection with the first bus bar 310 can likewise apply to the second bus bar 312.

As disclosed above, the first bus bar 310 has the inlet port 404 and the outlet port 406 to enable the cooling fluid to enter the example fluid channel 402 of the first bus bar 310 at the inlet port 404 and exit the example fluid channel 402 of the first bus bars 310 from the outlet port 406. In some examples, the inlet port 404 and the outlet port 406 are on a same end or side of the first bus bar 310. For example, as shown in FIG. 4, the first bus bar 310 has a first end 408 and a second end 410 opposite the first end 408. In the illustrated example, the inlet port 404 and the outlet port 406 are on the first end 408 of the first bus bar 310. The first end 408 of the first bus bar 310 is engaged with the inside of the first end wall 208 (FIG. 2). The first inlet port 220 (FIG. 2) on the first end wall 208 (FIG. 2) is aligned with the inlet port 404 of the first bus bar 310. As such, the inlet port 404 is fluidly coupled to the first inlet port 220 (FIG. 2). Similarly, the first outlet port 222 (FIG. 2) on the first end wall 208 (FIG. 2) is aligned with the outlet port 406 on the first bus bar 310.

In the illustrated example, the example fluid channel 402 forms a C-shaped or a U-shaped path through the first bus bar 310 between the inlet port 404 and the outlet port 406. For example, a first portion 412 of the fluid channel 402 traverses along a first edge 414 of the first bus bar 310 and a second portion 416 of the fluid channel 402 traverses along a second edge 418 of the first bus bar 310, and the first and second portions 412, 416 are coupled by a third (transverse) portion 420. In some examples, a top surface 422 of the first bus bar 310 is recessed 423 between the first, second, and third portions 412, 416, 420 of the fluid channel 402. In some examples, another cooling fluid that is in the battery 200 can accumulate or rest in the recess 423 of the first bus bar 310, as disclosed in further detail herein.

In other examples, the inlet port 404 and outlet port 406 can be disposed on opposite ends of the first bus bar 310. For example, the inlet port 404 can be disposed on the first end 408 of the first bus bar 310 and/or the outlet port 406 can be disposed on the second end 410 of the first bus bar 310. In the illustrated example, the inlet port 404 of the first bus bar 310 is disposed closer to a center line of the battery cells 304, such that new cooling fluid entering the fluid channel 402 is first transported along the center line area of the battery cells 304, which is typically the hottest area. However, in other examples, the inlet and outlet ports 404, 406 can be switched. Further, in other examples, the path of the fluid channel 402 forms an alternate shaped path through the first bus bar 310 between the inlet port 404 and the outlet port 406.

In the illustrated example, the first and second bus bars 310, 312 are positioned parallel to each other. In some examples, the bus bars 310, 312 can have equivalent structures and/or compositions following the teachings disclosed herein. For example, the second bus bar 312 has a fluid channel 424 between an inlet port 426 and an outlet port 428. The inlet and outlet port 426, 428 align with the second inlet and outlet ports 224, 226 (FIG. 2) on the first end wall 208 (FIG. 2). However, in other examples, the bus bars 310, 312 can have alternate structures and/or compositions.

Figure 5:
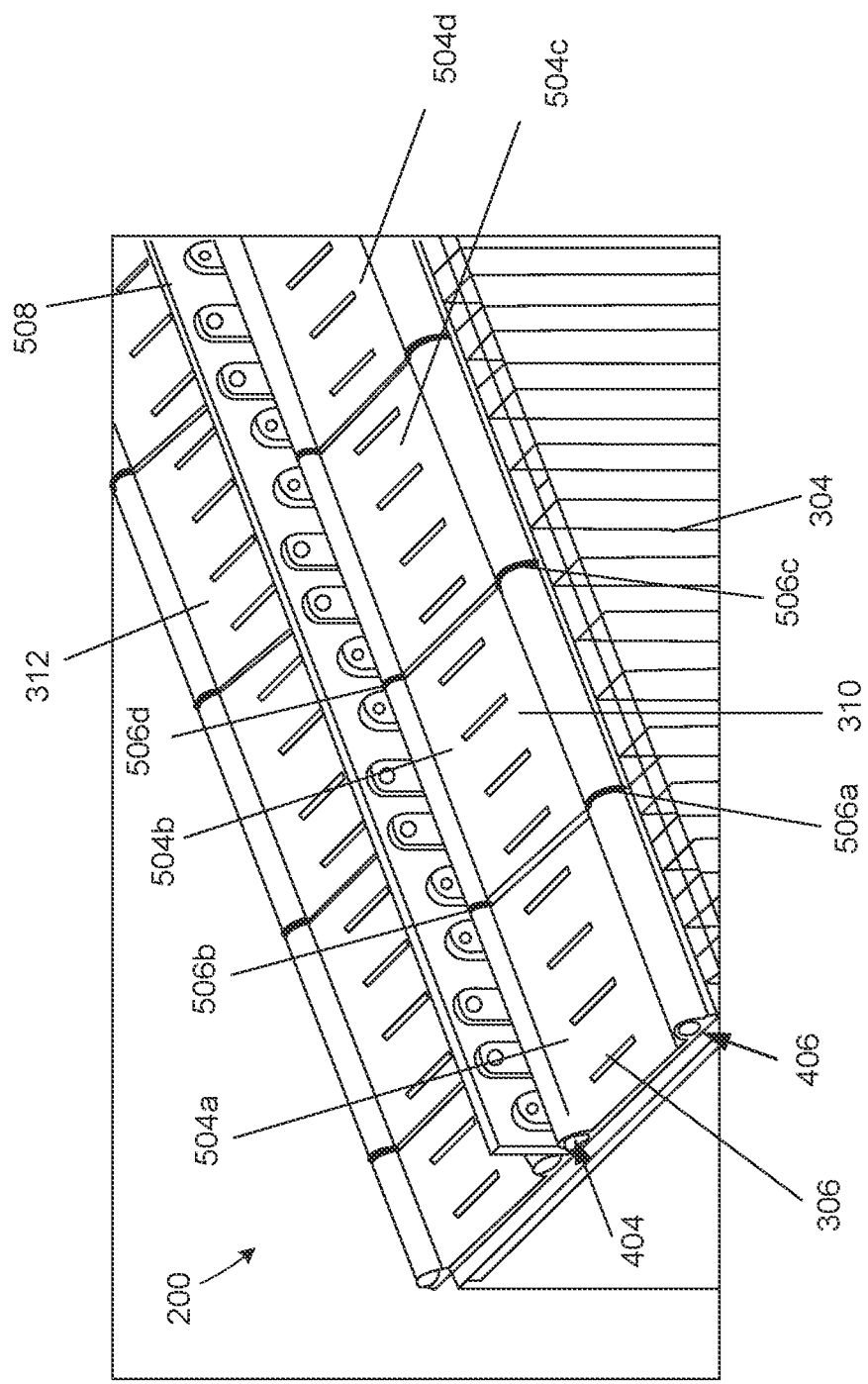
FIG. 5 is an enlarged view of a first end the example battery cells and the example bus bars of FIG. 4.

FIG. 5 is an enlarged perspective view of the ends of the first and second bus bar 310, 312 of FIG. 4. The inlet and outlet ports 404, 406 are shown in FIG. 5. In some examples, the first bus bar 310 is constructed of multiple bus bar sections that are coupled together. For example, in FIG. 5, the first bus bar 310 includes a first section 504a, a second section 504b, a third section 504c, and a fourth section 504d. Each of the sections 504a-504d can be electrically coupled to one or more of the battery cells 304 (one of which is referenced in FIG. 5). For example, the first section 504a is coupled to the first terminals 306 (one of which is referenced in FIG. 5) of the first four battery cells 304, the second section 504b is coupled to the first terminals 306 of the next four battery cells 304, and so forth. This enables the battery cells 304 to be electrically combined into discrete groups of battery cells (sometimes referred to as bricks). The first bus bar 310 can include any number of sections (e.g., one section, two sections, etc.). In some examples, the first bus bar 310 includes two bridge seals (e.g., spacers) between each of the sections 504a-504d. For example, the battery 200 includes first and second bridge seals 506a, 506b between the first and second sections 504a, 504b, third and fourth bridge seals 506c, 506d between the second and third sections 504b, 504c, etc. In some examples, the section 504a-504d and the bridge seals 506a-506d are coupled via an adhesive. In other examples, the sections 504a-504d and the bridge seals 506a-506d can be coupled via other techniques (e.g., friction fit, mechanical fasteners, etc.). The bridge seals 506a-506d help to fluidly coupled the sections of the fluid channel 402 formed in the sections 504a-504d and also electrically isolates the sections 504a-504d. In some examples, the bridge seals 506 are constructed of insulating or non-conductive material (e.g., plastic, rubber, etc.).

Figure 6:
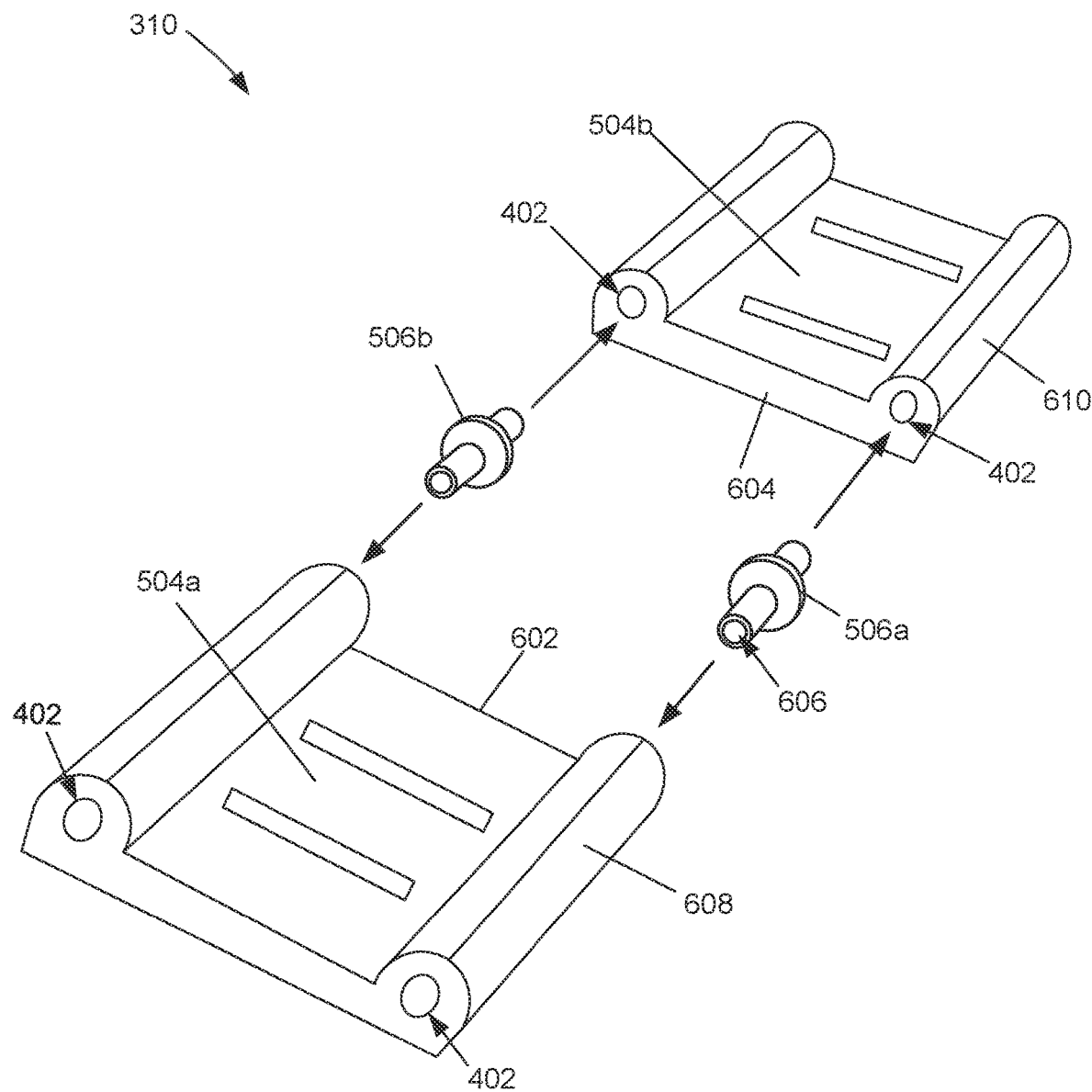
FIG. 6 is an exploded view of two example bus bar sections and example bridge seals used to form one of the example bus bars of FIGS. 3-5.

FIG. 6 is an exploded view of the first and second sections 504a, 504b of the first bus bar 310 (FIG. 5) and the first and second bridge seals 506a, 506b. The first and second bridge seals 506a, 506b are to be coupled (e.g., clamped) between an end 602 of the first section 504a and an end 604 of the second section 504b. The first bridge seal 506a has an opening 606 that is aligned with a first section 608 of the fluid channel 402 formed in the first section 504a and a second section 610 of the fluid channel 402 formed in the second section 504b. When the first bus bar 310 is assembled, the first bridge seal 506a fluidly couples the sections 608, 610 of the fluid channel 402 formed in the first and second sections 504a, 504b, respectively. This enables a substantially continuous flow path for the cooling fluid between the first and second sections 504a, 504b. In some examples, at least a portion of the first bridge seal 506a extends into the first and second sections 504a, 504b. The second bridge seal 506b similarly fluidly couples the other sections of the fluid channel 402 formed in the first and second sections 504a, 504b.

Figure 7:
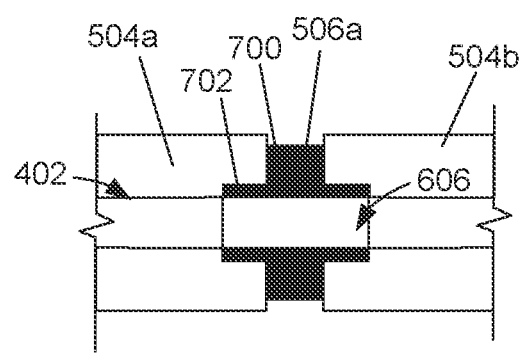
FIG. 7 is a cross-sectional view of the example bus bar sections and one of the example bridge seals of FIG. 6.

FIG. 7 is a cross-sectional view showing the first bridge seal 506a between the first section 504a and the second section 504b taken along the opening 606 in the first bridge seal 506a. As shown in FIG. 7, the first bridge seal 506a has a spacer portion 700 and a tubular portion 702 extending in opposite directions from the spacer portion 700. The tubular portion 702 extends in the fluid channel 402 formed in the first and second sections 504a, 504b. The spacer portion 700 has a larger diameter than the tubular portion 702 and physically separates the first and second section 504a, 504b. The opening 606 fluidly couples the sections of the fluid channel 402 formed in the first section 504a and the second section 504b. As such, the first bridge seal 506a enables cooling fluid to flow between the first and second sections 504a, 504b. Further, the first bridge seal 506a electrically isolates the first and second sections 504a, 504b. Thus, the interface formed by the first bridge seal 506a between the first and second sections 504a, 504b can maintain electrical separation across the first and second sections 504a, 504b while allowing a cooling fluid to flow continuously throughout the fluid channel 402. The other bus bar sections 504b-504d and bridge seals 506c, 506d are similarly arranged. Thus, each of the bus bar sections 504a-504d is electrically isolated from the other adjoining bus bar sections 504a-504d but can maintain circulation of the cooling fluid through the fluid channel 402 without breaks.

Referring back to FIG. 5, the example battery 200 includes a central spine 508 disposed between the first bus bar 310 and the second bus bar 312. In some examples, the central spine 508 traverses along a centerline of the battery cells 304. In some examples, the housing 202 (FIG. 2) includes features on which the central spine 508 can rest. The first and second bus bars 310, 312 are mechanically and electrically coupled to the central spine 508. In particular, each of the sections of the first and second bus bars 310, 312 is electrically coupled to the central spine 508. The central spine 508 includes circuitry to measure and monitor the voltage of the battery cells 304 and/or the groups (bricks) of the battery cells 304 at each of the sections. If one or more of the battery cells 304 and/or the groups of battery cells 304 is outputting too much power, the circuitry can turn off or deactivate the battery 200, for example. In some examples, the central spine 508 is a circuit board, such as a printed circuit board (PCB).

Figure 8:
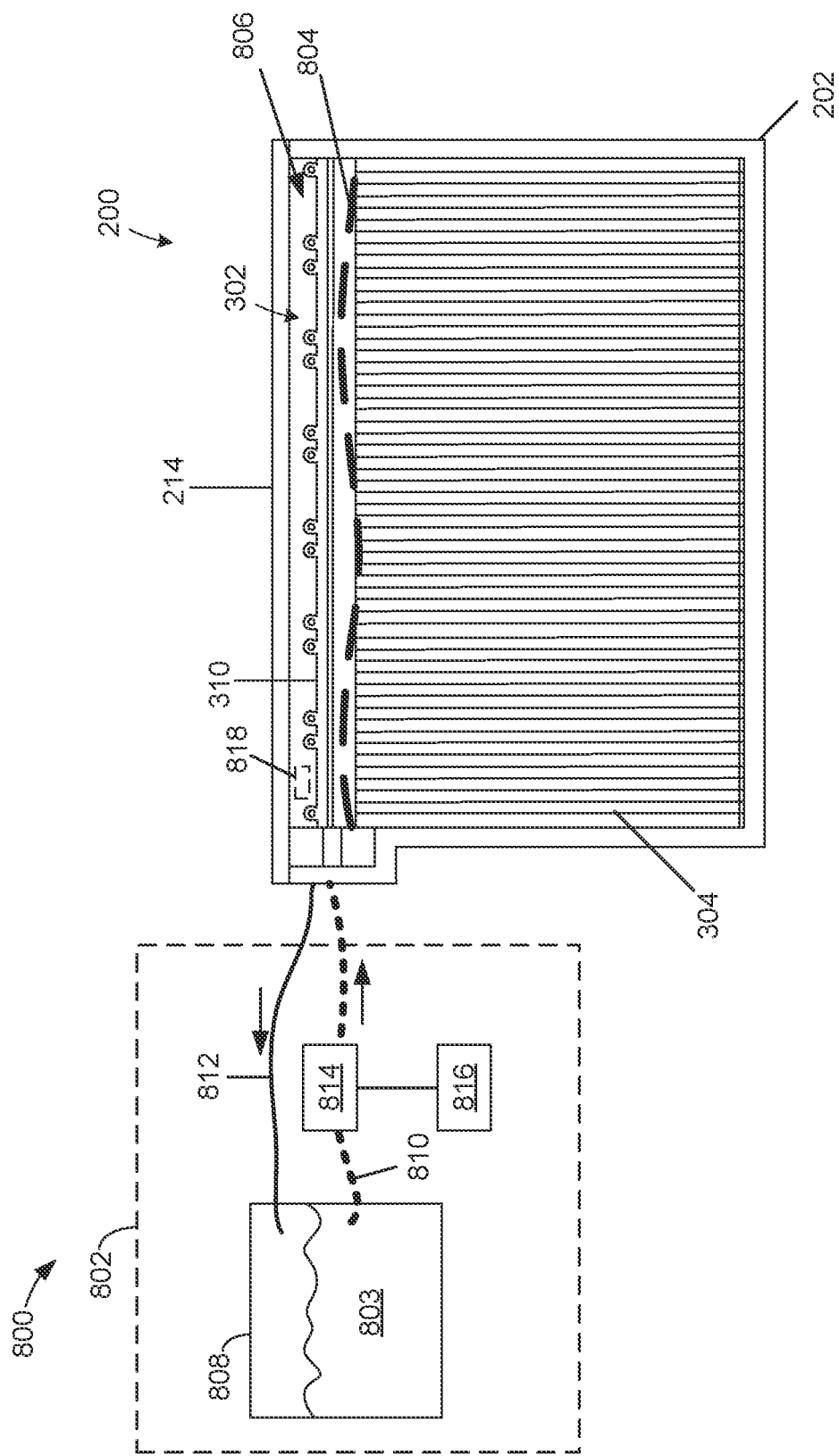
FIG. 8 illustrates an example battery system including the example battery of FIG. 2 and an example control system. The example battery is shown as a side cross-sectional view, and the example control system is shown as a schematic.

FIG. 8 illustrates an example battery system 800 including the example battery 200 and an example control system 802 implemented in connection with the example battery 200. In particular, FIG. 8 shows a cross-sectional side view of the example battery 200 and a schematic of the example control system 802. The control system 802 can be used to pump a cooling fluid 803, referred to herein as the first cooling fluid 803, through the first and second bus bars 310, 312 (only the first bus bar 310 is visible in FIG. 8), as disclosed in further detail below.

In some examples, the battery 200 includes a cooling fluid 804, referred to herein as the second cooling fluid 804, in the cavity 302 of the housing 202. In FIG. 8, reference number 804 points to the top surface of the second cooling fluid 804. The second cooling fluid 804 is separate from the first cooling fluid 803 that is pumped through the first bus bars 310. The battery cells 304 (one of which is referenced in FIG. 8) are at least partially submerged in the second cooling fluid 804. In some examples, such as shown in FIG. 8, the battery cells 304 are fully submerged in the second cooling fluid 804. In the illustrated example, the surface of the second cooling fluid 804 is above the tops of the battery cells 304, but below the first and second bus bars 310, 312. In some examples, the battery cells 304 are spaced apart from each other, such that the second cooling fluid 804 can flow between the battery cells 304. The second cooling fluid 804 draws heat away from the battery cells 304 (and distributes the heat evenly around the battery 200), which helps reduce the temperature of the battery 200. The second cooling fluid 804 can be a dielectric fluid, such as a 3M™ Novec™ 7100 Engineered Fluid. In some examples, the second cooling fluid 804 is an evaporating fluid. In some examples, the cooling fluid 804 is the same type of cooling fluid as the first cooling fluid 803, whereas, in other examples, the cooling fluids can be different types of cooling fluids.

In some examples, the cavity 302 is only partially filled with the second cooling fluid 804. In other words, the second cooling fluid 804 does not completely fill the cavity 302. This reduces the overall weight of the battery 200 compared to known batteries, which is beneficial in aerospace applications where weight is a concern. As shown in FIG. 8, an air gap 806 is formed between the top surface of the example cooling fluid 804 and the lid 214 (e.g., the top) of the housing 202. In some examples, when the battery cells 304 increase in temperature, at least some of the second cooling fluid 804 undergoes a phase change from a liquid state to a gaseous state. For example, during operation, the battery cells 304 may become hot, which heats up the second cooling fluid 804 and causes some of the second cooling fluid 804 to evaporate. The evaporated portion of the second cooling fluid 804 rises into the air gap 806 where the first and second bus bar 310, 312 are located. The first and second bus bars 310, 312 can have a lower temperature due to the first cooling fluid 803 being pumped through the fluid channel 402 of each bus bars 310, 312. As a result, the evaporated portion of the second cooling fluid 804 condenses onto the first and second bus bars 310, 312. In some examples, the condensed cooling fluid collects or accumulates in the recess 423 (FIG. 4) on the top surfaces of the first and second bus bars 310, 312. The condensed portion of the second cooling fluid 804 drips over the edges or sides of the bus bars 310, 312 and returns to the base of the cavity 302. In some examples, the first and second bus bars 310, 312 have one or more pores or openings through which the condensed cooling fluid can drain. This cycle (evaporate and condense) can repeat continuously and helps to reduce the temperature of the battery 200. In this example, the bus bars 310, 312 form a cooling circuit in the air gap 806 that draws the heat from the evaporated portion of the second cooling fluid 804, thereby enabling the second cooling fluid 804 to condense and complete the cooling cycle. However, in other examples, other mechanisms can be used as the cooling circuit in the air gap 806. As such, the second cooling fluid 804 can reduce the temperature of the example battery 200 to cool the battery 200 during high temperature operation and/or a thermal runaway event, thus facilitating thermal control and management of the battery 200 to keep the temperature of the battery 200 within a desired range.

As mentioned above, FIG. 8 also shows a schematic of the example control system 802. The control system 802 forms part of the cooling circuit with the first bus bar 310. In the illustrated example, the control system 802 includes a reservoir 808 of the cooling fluid 803, a supply line 810 coupled between the reservoir 808 and the inlet port 220 (FIG. 2) on the housing 202, a return line 812 coupled between the outlet port 222 (FIG. 2) on the housing 202 and the reservoir 808, a pump 814 coupled to the supply line 810, and a controller 816 to control the pump 814 (e.g., turn the pump on or off and/or control the speed of the pump 814). When the pump 814 is activated, the pump 814 pumps the first cooling fluid 803 through the supply line 810 from the reservoir 808 to the inlet port 220 (FIG. 2) on the housing 202. The first cooling fluid 803 flows through the inlet port 220 (FIG. 2) and into the inlet port 404 (FIG. 4) in the first bus bar 310. The first cooling fluid 803 flows through the fluid channel 402 (FIG. 4) in the first bus bar 310. The first cooling fluid 803 then exits the outlet port 406 (FIG. 4) in the first bar 310. The first cooling fluid 803 flows through the outlet port 222 (FIG. 2) on the housing 202 to the return line 812, and through the return line 812 back into the reservoir 808. As such, the first cooling fluid 803 is fluidly isolated from and separate from the second cooling fluid 804. In some examples, the control system 802 includes a heat exchanger to cool the first cooling fluid 803 before returning to the battery 200.

In examples disclosed, the controller 816 operates to activate and deactivate the pump 814 to maintain the battery 200 within a desired temperature range (e.g., below a first threshold and/or above a second threshold). Additionally or alternatively, the controller 816 can increase or decrease the power of the pump 814 to increase or decrease the flow rate of the first cooling fluid 803 through the first bus bar 310. In some examples, the controller 816 can monitor a temperature of the battery 200 based on signals from a temperature sensor 818. In some examples, the temperature sensor 818 is disposed in the cavity 302. The temperature sensor 818 is communicatively coupled to the controller 816 via a wired or wireless connection. The controller 816 can activate/deactivate the pump 814 and/or increase/decrease the power to the pump 814 based on the temperature. When the controller 816 activates the pump 814, the first cooling fluid 803 can circulate through the fluid channel 402 (FIG. 4), which helps reduce the temperature of the first bus bar 310 and, thus, helps maintain the battery temperature within a desired temperature range. In some examples, if the pump 814 fails, the second cooling fluid 804 submerging the battery cells 304 in the cavity 302 of the battery housing 202 can still facilitate thermal management of the battery 200 to keep the temperature of the battery 200 within an operational temperature range. While the example control system 802 is disclosed in connection with the first bus bar 310, the control system 802 (or a separate control system) can similarly control the pumping of cooling fluid through the second bus bar 312.

Figure 9:
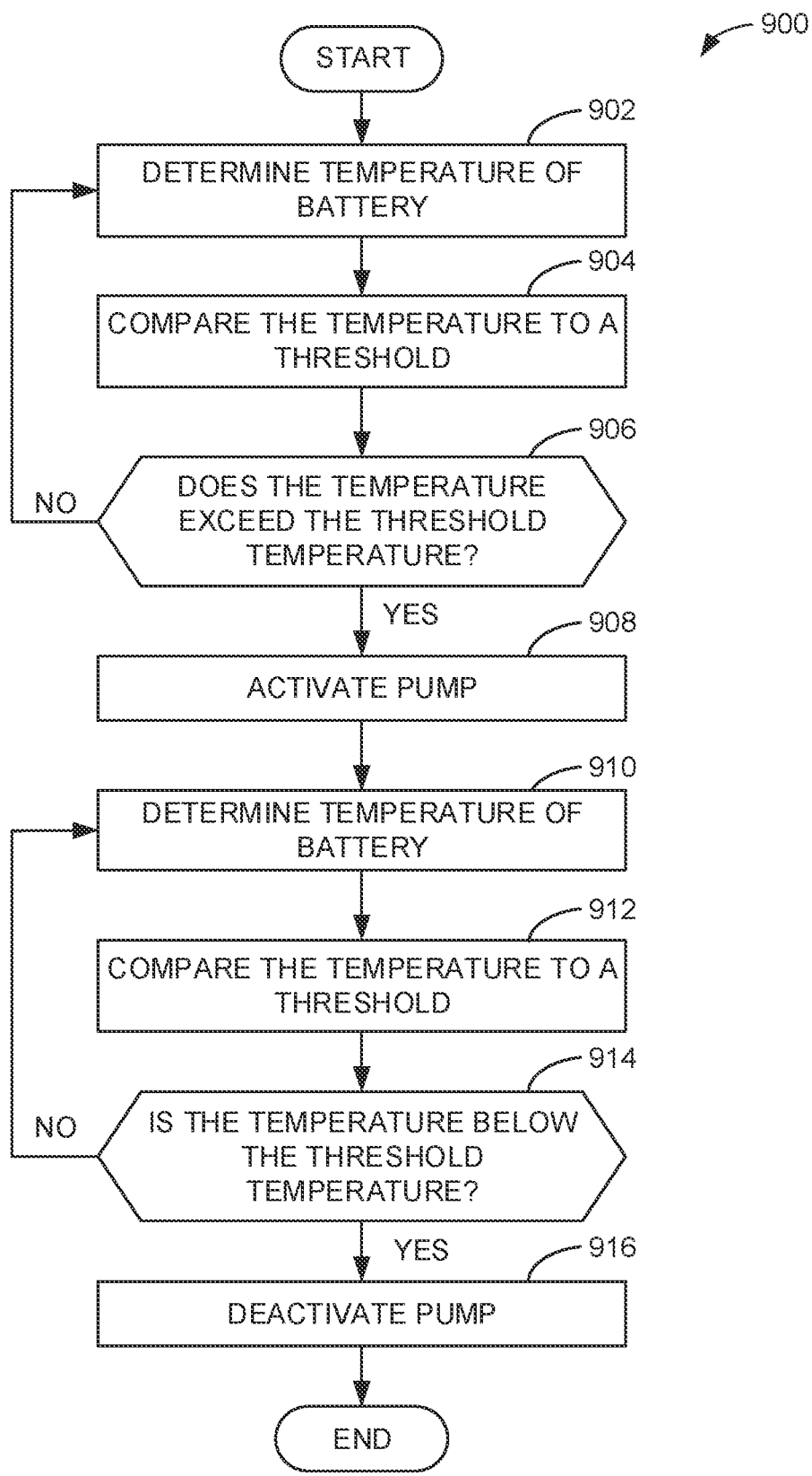
FIG. 9 is a flowchart of an example method, which can be implemented by the example control system of FIG. 8, to activate a pump to pump a cooling fluid through a fluid channel of a bus bar in the example battery.

FIG. 9 is a flowchart representative of an example method 900 that can be implemented by the example control system 802. In particular, the method 900 of FIG. 9 can be implemented by instructions that are executed by the controller 816. The controller 816 can be implemented by one or more digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). The method 900 is described in connection with pumping fluid through the first bus bar 310. However, the method 900 can be similarly performed in connection with the second bus bar 312.

Although the example method 900 is described with reference to the flowchart illustrated in FIG. 9, many other methods can alternatively be used. For example, some of the blocks described herein can be changed, eliminated, or combined.

The example method starts with the pump 814 off or deactivated. At block 902, the controller 816 determines the temperature of the battery 200 based on signals from the temperature sensor 818. The battery temperature can be measured or determined continuously during the operation of the battery 200 or periodically over increments of time (e.g., every 10 seconds). At block 904, the controller 816 compares the temperature to a threshold temperature. The threshold temperature can vary across battery types, use cases, and/or depending on the type(s) of cooling fluids used by the fluid circuit and/or to submerge the battery cells 304. At block 906, the controller 816 determines if the determined battery temperature exceeds the threshold temperature. In response to determining that the battery temperature exceeds the threshold temperature, the controller 816, at block 908, activates the pump 814 to pump the first cooling fluid 803 through the fluid channel 402 of the first bus bar 310 to reduce the temperature of the battery 200. In contrast, if the battery temperature does not exceed the threshold temperature the pump 814 remains deactivated and control proceeds to block 902.

At block 910, the controller 816 determines the temperature of the battery 200 after the activation of the pump 814 at block 908. At block 912, the controller 816 compares the battery temperature to the temperature threshold. At block 914, the controller 816 determines whether the battery temperature decreased, for example during the operation of the pump 814, and returned to a temperature below the threshold temperature. In response to determining that the battery temperature has fallen below the threshold temperature, the controller 816, at block 916, deactivates the pump 814 to cease pumping of the cooling fluid through the fluid channel 402. However, if controller 816 determines that the temperature is above the threshold, the controller 816 keeps the pump 814 activated, and control proceeds back to block 910. After block 916, the example method 900 can end or control can proceed back to block 902 and the example 900 can repeat.

"Including," "comprising," "containing," (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. can be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions can be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that enable thermal management of batteries that are advantageous to known methods and apparatus. The methods and apparatus disclosed herein provide solutions that address the maintenance of batteries within operating temperature ranges while also considering energy capacity and weight characteristic improvements in batteries. Such advantages can not only extend the cycle life of batteries but can also mitigate risks of battery overheating and thus thermal runaway events. The examples disclosed herein improve heat transfer and cell temperature uniformity.

Example methods, apparatus, and articles of manufacture for thermal management of batteries are been disclosed herein. Examples and example combinations disclosed herein include:

Example 1 is a battery including a housing defining a cavity and a battery cell disposed in the cavity of the housing. The battery cell has a terminal. The battery also includes a bus bar disposed in the cavity of the housing. The bus bar is coupled to the terminal. A fluid channel is formed in the bus bar. The fluid channel is to receive a cooling fluid to cool the bus bar and reduce a temperature of the battery.

Example 2 includes the battery of Example 1, wherein the fluid channel forms a C-shaped or U-shaped path through the bus bar.

Example 3 includes the battery of Examples 1 or 2, wherein the fluid channel is formed between an inlet port and an outlet port on the bus bar on a same end of the bus bar.

Example 4 includes the battery of Example 3, wherein the housing has a wall with an inlet port aligned with the inlet port of the bus bar.

Example 5 includes the battery of Example 4, wherein the wall of the housing has an outlet port aligned with the outlet port of the bus bar.

Example 6 includes the battery of any of Examples 1-5, wherein a first portion of the fluid channel traverses along a first edge of the bus bar and a second portion of the fluid channel traverses along a second edge of the bas bar opposite the first edge, and wherein a top surface of the bus bar is recessed between the first and second portions of the fluid channel.

Example 7 includes the battery of any of Examples 1-6, wherein the bus bar includes a first bus bar section, a second bus bar section, and a bridge seal between the first bus bar section and the second bus bar section.

Example 8 includes the battery of Example 7, wherein a first section of the fluid channel is formed in the first bus bar section and a second section of the fluid channel is formed in the second bus bar section, and wherein the bridge seal has an opening aligned with the first section of the fluid channel and the second section of the fluid channel to enable the cooling fluid to flow between the first and second sections of the fluid channel.

Example 9 includes the battery of Examples 7 or 8, wherein the bridge seal extends at least partially into the first and second bus bar sections.

Example 10 includes the battery of any of Examples 7-9, wherein the bridge seal electrically isolates the first and second bus bar sections.

Example 11 includes the battery of any of Examples 1-10, wherein the terminal is a first terminal, the bus bar is a first bus bar, and the fluid channel is a first fluid channel. The battery further includes a second bus bar coupled to a second terminal of the battery cell. The second bus bar is disposed parallel to the first bus bar. A second fluid channel is formed in the second bus bar.

Example 12 includes the battery of Example 11, further including a central spine disposed between the first and second bus bars. The first and second bus bars are electrically coupled to the central spine. The central spine includes circuitry to measure voltage of the battery cell.

Example 13 includes the battery of any of Examples 1-12, wherein the cooling fluid is a first cooling fluid. The battery further includes a second cooling fluid in the cavity of the housing. The battery cell is at least partially submerged in the second cooling fluid.

Example 14 is a battery including a housing defining a cavity, a battery cell disposed in the cavity of the housing, and a cooling fluid in the cavity of the housing that at least partially submerges the battery cell. The cooling fluid partially fills the cavity such that an air gap is formed between a top surface of the cooling fluid and a top of the housing. The battery also includes a cooling circuit disposed in the air gap.

Example 15 includes the battery of Example 14, further including a bus bar coupled to a terminal of the battery cell. The cooling fluid is a first cooling fluid, the cooling circuit is formed in the bus bar, and the cooling circuit is to receive a second cooling fluid to reduce a temperature of the bus bar.

Example 16 includes the battery of Example 15, wherein the second cooling fluid is fluidly isolated from the first cooling fluid in the cavity.

Example 17 includes the battery of any of Examples 14-16, wherein the housing includes a wall with a port. The battery further includes a pressure release valve in the port.

Example 18 is a method including determining a temperature of a battery. The battery includes a bus bar having a fluid channel formed therein. The method further includes comparing the temperature to a threshold and, in response to determining that the temperature exceeds the threshold, activating a pump to pump cooling fluid through the fluid channel in the bus bar to reduce the temperature of the battery.

Example 19 includes the method of Example 18, wherein the cooling fluid enters the fluid channel of the bus bar through an inlet port and exits the fluid channel of the bus bar through an outlet port. The outlet port is located on a same end of the bus bar as the inlet port.

Example 20 includes the method of Examples 18 or 19, further including, in response to determine that the temperature falls below the threshold, deactivating the pump to cease pumping the cooling fluid through the fluid channel.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the subject disclosure.

What is claimed is:
1. A battery, comprising:
a housing defining a cavity;
a battery cell disposed in the cavity of the housing, the battery cell having a terminal; and
a bus bar disposed in the cavity of the housing, the bus bar coupled to the terminal, the bus bar including:
a fluid channel including a first portion traversing a first edge of the bus bar, a second portion traversing a second edge of the bus bar, and a third portion traversing a third edge of the bus bar; the second edge opposite the first edge; the third edge disposed between the first edge and the second edge; the first portion, the second portion, and the third portion of the fluid channel defining a fluid flow path; the fluid channel to receive a cooling fluid to cool the bus bar and reduce a temperature of the battery; and a surface opposite the battery cell, the surface recessed relative to the first portion, the second portion, and the third portion of the fluid channel, the recessed surface facing away from the battery cell.

2. The battery of claim 1, wherein the first portion, the second portion, and the third portion of the fluid channel form a C-shaped or U-shaped path through the bus bar.

3. The battery of claim 1, wherein the fluid channel is formed between an inlet port and an outlet port on the bus bar on a same end of the bus bar.

4. The battery of claim 3, wherein the housing has a wall with an inlet port aligned with the inlet port of the bus bar.

5. The battery of claim 4, wherein the wall of the housing has an outlet port aligned with the outlet port of the bus bar.

6. The battery of claim 1, wherein the bus bar includes:
a first bus bar section;
a second bus bar section; and
a bridge seal between the first bus bar section and the second bus bar section.

7. The battery of claim 6, wherein a first section of the first portion of the fluid channel is formed in the first bus bar section and a second section of the first portion of the fluid channel is formed in the second bus bar section, and wherein the bridge seal has an opening aligned with the first section of the first portion of the fluid channel and the second section of the first portion of the fluid channel to enable the cooling fluid to flow between the first and second sections of the first portion of the fluid channel.

8. The battery of claim 7, wherein the bridge seal extends at least partially into the first and second bus bar sections.

9. The battery of claim 7, wherein the bridge seal electrically isolates the first and second bus bar sections.

10. The battery of claim 1, wherein the terminal is a first terminal, the bus bar is a first bus bar, and the fluid channel is a first fluid channel, further including a second bus bar coupled to a second terminal of the battery cell, the second bus bar disposed parallel to the first bus bar, a second fluid channel formed in the second bus bar.

11. The battery of claim 10, further including a central spine disposed between the first and second bus bars, the first and second bus bars electrically coupled to the central spine, wherein the central spine includes circuitry to measure voltage of the battery cell.

12. The battery of claim 1, wherein the cooling fluid is a first cooling fluid, the battery further including a second cooling fluid in the cavity of the housing, the battery cell at least partially submerged in the second cooling fluid.

13. A method comprising:
determining a temperature of a battery, the battery including:
a housing defining a cavity;
a battery cell disposed in the cavity of the housing, the battery cell having a terminal; and
a bus bar having a fluid channel formed therein, the fluid channel including a first portion traversing a first edge of the bus bar, a second portion traversing a second edge of the bus bar, and a third portion traversing a third edge of the bus bar; the second edge opposite the first edge; the third edge disposed between the first edge and the second edge; the first portion, the second portion, and the third portion of the fluid channel defining a fluid flow path; the bus bar disposed in the cavity of the housing; the bus bar coupled to the terminal; the bus bar including a surface opposite the battery cell; the surface recessed relative to the first portion, the second portion, and the third portion of the fluid channel, the recessed surface facing away from the battery cell; comparing the temperature to a threshold; and
in response to determining that the temperature exceeds the threshold, activating a pump to pump cooling fluid through the fluid channel in the bus bar to reduce the temperature of the battery.

14. The method of claim 13, wherein the cooling fluid enters the fluid channel of the bus bar through an inlet port and exits the fluid channel of the bus bar through an outlet port, the outlet port located on a same end of the bus bar as the inlet port.

15. The method of claim 13, further including, in response to determining that the temperature falls below the threshold, deactivating the pump to cease pumping the cooling fluid through the fluid channel.

16. The battery of claim 8, wherein the bridge seal includes a spacer portion and a tubular portion extending in opposite directions from the spacer portion, the tubular portion extending into the first and second bus bar sections.

17. The battery of claim 12, wherein the second cooling fluid partially fills the cavity of the housing such that an air gap is formed between a top surface of the second cooling fluid and a top of the housing, and wherein the bus bar is disposed in the air gap.

18. The battery of claim 17, wherein the first cooling fluid is fluidly isolated from the second cooling fluid.

19. The battery of claim 1, wherein the housing includes a wall with a port, the battery further including a pressure release valve in the port.

20. The battery of claim 12, wherein a portion of the second cooling fluid rests in the recessed surface.

* * * * *